July 13, 1937.  F. CORDERO  2,086,537
VIBROMETER
Filed Aug. 23, 1935

INVENTOR
Fidel Cordero
BY
ATTORNEY

UNITED STATES PATENT OFFICE 2,086,537

VIBROMETER

Fidel Cordero, Washington, D. C.

Application August 23, 1935, Serial No. 37,611

7 Claims. (Cl. 73—51)

(Granted under the act of March 3, 1883, as amended April 30, 1928; 370 O. G. 757)

This invention relates to an instrument for measuring the amplitude of vibration of machine parts, especially when such amplitudes are small. It is the object of this invention to provide a device for the purpose specified which shall be small, easily manipulated, and accurate in its results.

Figure 1:
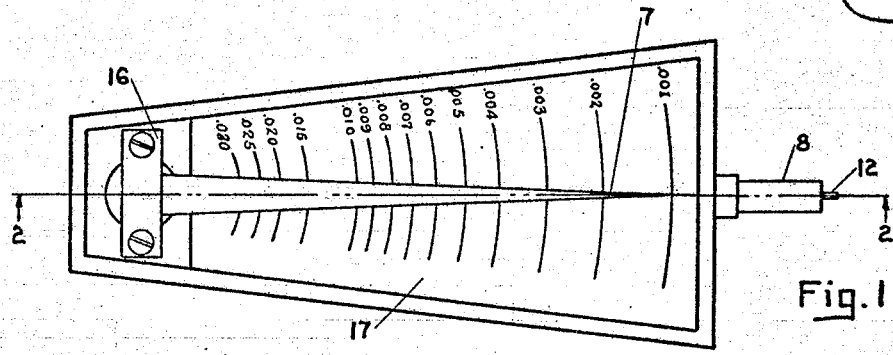
Fig. 1 is a face view of the present invention.
Figure 2:
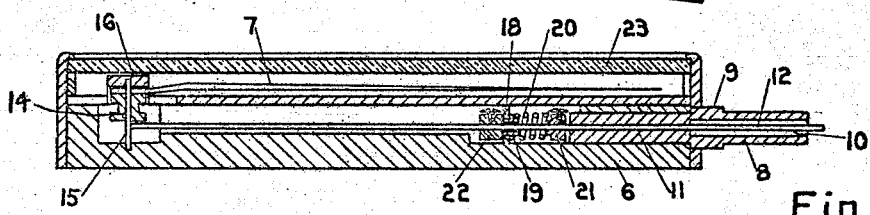
Fig. 2 is a section thereof on the line 2—2, Fig. 1.

It is frequently desirable to ascertain the amplitude of vibration of the parts of a machine or a structure when such amplitude is too small to be determined with instruments ordinarily available. For example, it may be important to know the amplitude of vibration of a part of an engine, but hitherto no readily portable means has been available for this purpose in general applications.

The body 6 of my instrument is made relatively heavy in comparison with the vibrating system later to be described, in order that the body will have sufficient inertia to remain substantially undisturbed by the vibrations of the machine element in conjunction with which it is being used. One end of the body is made of sufficient breadth to permit the desired swing of the index 7. Secured in the above mentioned end of the body 6 is the bushing 8, having a collar 9 thereon to seat at one end against the body 6. The bushing 8 is bored along its longitudinal axis, the outer portion 10 of the bore being of greater diameter than the inner portion 11 thereof. Mounted in the bore in bushing 8 is a rod 12 that is of light weight but of sufficient rigidity to transmit vibratory movements longitudinally of itself, this rod being of such cross section that it fits snugly in the portion 11 of the bore, but is spaced from the larger portion 10 of the bore to permit lateral flexibility of the rod at its free end to allow the end of the rod to follow the components of vibration transverse to the axis of the rod. One end of the rod 12 projects somewhat beyond the outer end of the bushing 8 and the other end of the rod is offset, with the tip of the offset portion turned substantially at right angles to the remainder of the offset portion, to be inserted into a hole 13 in a rotatably mounted pivot member 14 carried on a spindle 15 that has one end journalled in the body 6 and the other end journalled in a bridge 16. The intermediate portion of member 14 is cut away to lighten the same and reduce its inertia, thus forming flanges at the end thereof which flanges give a sufficient torque arm between the center of member 14 and the points where rod 12 and index 7 are connected thereto. The index 7 is mounted at one end upon the member 14 and extends over a scale 17 fixed in the body 6 under the index.

Extending upwardly from the body 6 a short distance from the inner end of bushing 8 is a rib 18, wherein is fixed a guide and spring abutment bushing 19, through which the rod 12 slides freely. Spring 20 has one end seated upon the bushing 19 and is held under the desired degree of compression by a collar 21 fixed on the rod 12 to bear against the other end of the spring. A second collar 22 is secured on the rod 12 a small distance from the bushing 19 on the side thereof opposite that against which the spring 20 bears. The stiffness of the spring is so chosen that the vibrating system composed of the rod 12 and the moving parts connected thereto shall have a natural period of vibration at least five times as great as the maximum vibration period at which it is to be used. The parts of the vibrating system are made as light as possible to reduce to a minimum the effects of inertia. Index 7 is preferably made of light gauge aluminum and is transversely arched to impart to it the requisite rigidity. It will be observed in Fig. 3 that the point of connection of rod 12 is spaced from the axis of rotation of the member 14 to provide a torque arm whereby longitudinal movement of the rod 12 will be transformed into angular movement of the member 14 and the index mounted thereon. A glass cover 23 protects the index 7 from injury and excludes dirt from the body 6.

Figure 4:
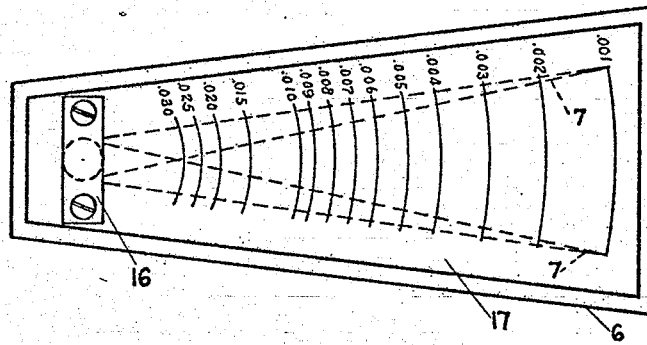
Fig. 4 shows the appearance of the instrument when in operative contact with a vibrating element.
Figure 5:
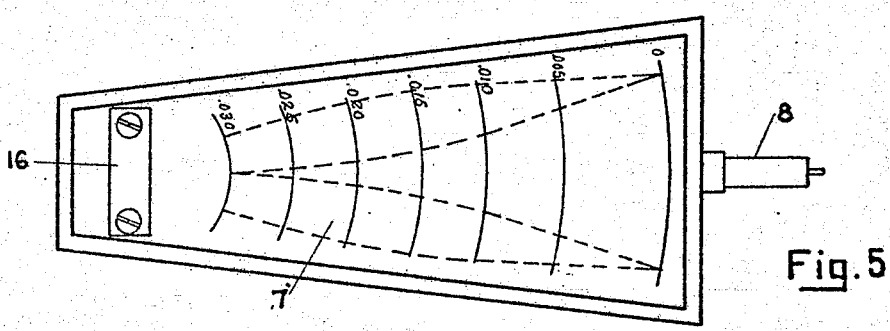
Fig. 5 is a view similar to Fig. 4 except that the index is of different shape.
Figure 3:
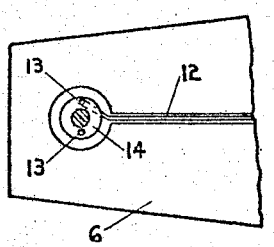
Fig. 3 is a detailed view of the connection between the index and the member that transmits the vibration.

The method of using my present invention is as follows: The body 6 is held in the hand and the outer end of the rod 12 is touched against the body whereof the amplitude of vibration is to be determined, with the axis of the rod lying in the direction of vibration, it being obvious that if it is desired to measure the amplitude of the vibrations of a single body in different directions it is necessary merely to bring the rod 12 into contact with the body at different points, while maintaining the length of the rod in the desired direction. The movements of the vibrating member are transmitted to the member 12 and, through the connection between the rod 12 and index 7 above described, the index is caused to swing rapidly back and forth across the scale 17 with the same period as that of the vibration being measured. Owing to the fact that frequencies of movement higher than about 15 per second are not perceptible to the eye as separate movements, the effect of which is known as the persistence of vision, the index 7 appears to be stationary at two positions approximately equally spaced from the longitudinal center line of the instrument and on opposite sides of this center line. While the movement of the index over the greater portion of its travel is too rapid for the eye to follow, yet at the end of each swing its velocity necessarily becomes zero and hence the index appears to be stationary in two positions as above described, and as indicated in dotted lines in Fig. 4. It is apparent that the angular movement of the index 7 is proportional to the amplitude of vibration being impressed upon the rod 12 thereof, the point of intersection of the adjacent edges of the index in its two apparent positions therefore indicates the degree of angular movement being executed by the index, and scale 17 is accordingly calibrated to represent amplitudes of vibration so indicated by the aforesaid apparent intersection. As shown in Fig. 3 the apparent intersection indicates an amplitude of 0.030 inch. The scale shown in the drawing is calibrated for amplitudes of vibration between 0.001 inch and 0.030 inch, but obviously the range of amplitudes that can be measured may be varied at will, within limits, by proper design of the vibratory system. Fig. 4 discloses an instrument provided with an index 7' that does not taper uniformly throughout its length but is of substantially fusiform outline as indicated in the said figure. The advantage of an index having this outline form is that the scale intervals may be uniformly or approximately uniformly spaced instead of non-uniformly spaced, as in the scales shown in Figs. 1 and 4.

This invention may be made and used by or for the Government for governmental purposes without the payment of any royalty thereon.

I claim:

1. A device for measuring small amplitudes of vibration, comprising a relatively heavy body substantially wider at one end than at the other, a bushing seated in said body at its wider end to lie along the median longitudinal line of the body and extending beyond the said wider end, there being in said bushing an axial bore that is of greater diameter through the outer portion of the bushing than through the inner portion thereof, a pivot member having spaced radially extending flanges pivotally mounted in said body adjacent the narrower end thereof, a rod slidable in the bore in said bushing having one end extending beyond the outer end of the bushing and having its other end offset and pivotally connected to one flange on the pivot member at a point radially spaced from the axis of rotation of the pivot member, a light index fixed to the other flange of said pivot member, a spring abutment fixed to said body and spaced from the inner end of said bushing, a helical spring around said rod between said abutment and said bushing, a collar fixed on said rod and seated against said spring, a second collar fixed on said rod a small distance from the side of said abutment away from said spring; a calibrated scale disposed under said index, and a transparent cover over said index and scale.

2. A device for measuring small amplitudes of vibration, comprising a relatively heavy body substantially wider at one end than at the other, a bushing seated in said body at its wider end to lie along the median longitudinal line of the body and extending beyond the said wider end, there being in said bushing an axial bore that is of greater diameter through the outer portion of the bushing than through the inner portion thereof, an oscillatable element mounted in said body with its axis of oscillation normal to said median line, a rod slidable in the bore in said bushing having one end extending beyond the outer end of the bushing and having its other end pivotally connected to said element at a point to provide a torque arm between said point and said axis, a light index fixed to said element, a spring abutment fixed to said body and spaced from the inner end of said bushing, a helical spring around said rod between said abutment and said bushing, a collar fixed on said rod and seated against said spring, a second collar fixed on said rod a small distance from the side of said abutment away from said spring, a calibrated scale disposed under said index, and a transparent cover over said index and said scale.

3. A device for measuring small amplitudes of vibration, comprising a relatively heavy body substantially wider at one end than at the other, a bushing seated in said body at its wider end to lie along the median longitudinal line of the body and extending beyond the said wider end, there being in said bushing an axial bore that is of greater diameter through the outer portion of the bushing than through the inner portion thereof, an oscillatable element mounted in said body with its axis of oscillation normal to said median line, a rod slidable in the bore in said bushing having one end extending beyond the outer end of the bushing and having its other end pivotally connected to said element at a point to provide a torque arm between said point and said axis, a light index fixed to said element, said index being substantially fusiform in outline, a spring abutment fixed to said body and spaced from the inner end of said bushing, a helical spring around said rod between said abutment and said bushing, a collar fixed on said rod and seated against said spring, a second collar fixed on said rod a small distance from the side of said abutment away from said spring, and a calibrated scale disposed under said index.

4. A device for measuring small amplitudes of vibration, comprising a relatively heavy body substantially wider at one end than at the other, a bushing seated in said body at its wider end to lie along the median longitudinal line of the body and extending beyond the said wider end, there being in said bushing an axial bore that is of greater diameter through the outer portion of the bushing than through the inner portion thereof, an oscillatable element mounted in said body with its axis of oscillation normal to said median line, a rod slidable in the bore in said bushing having one end extending beyond the outer end of the bushing and having its other end pivotally connected to said element at a point to provide a torque arm between said point and said axis, a light index fixed to said element, said index being substantially fusiform in outline, a spring abutment fixed to said body and spaced from the inner end of said bushing, a helical spring around said rod between said abutment and said bushing, a collar fixed on said rod and seated against said spring, a second collar fixed on said rod a small distance from the side of said abutment away from said spring, and a calibrated scale disposed under said index, said scale having substantially uniformly spaced graduations.

5. A device for measuring amplitudes of vibration, comprising a body, a member mounted therein to be longitudinally vibratable when an end thereof is held in contact with a vibrating body, means associated with said member to cause said member to remain in contact with a vibrating body, an index, means connecting said member to an end of said index to transform longitudinal movement of the member into angular movement of said index about the said end thereof, and a scale mounted on said body under said index extending substantially the full length of the index and calibrated to indicate amplitudes of vibration corresponding to the intersection of positions of the opposite edges of said index at two extreme displacements when vibrating.

6. A device for measuring amplitudes of vibration, comprising a body of high inertia relatively to the hereinafter specified movable parts carried thereby, a light rod mounted in said body to be longitudinally reciprocable and having one end extending beyond said body, means to prevent reciprocation of said rod over more than a predetermined amplitude, resilient means to load said rod, a member mounted in said body for rotary oscillation with its axis of oscillation normal to the axis of said rod, the said rod being connected to said member at a point to provide a torque arm between said point and the axis of oscillation of the member, a light index carried by said member and extending almost the full length of said body with a free end adjacent the free end of said rod and a calibrated scale disposed under said index throughout substantially the full length of said index.

7. A device for measuring amplitudes of vibration, comprising a body of high inertia relatively to the hereinafter specified movable parts carried thereby, a light rod mounted in said body to be longitudinally reciprocable and having one end extending beyond said body, a portion of said rod adjacent said one end being free for lateral flexion, means to prevent reciprocation of said rod over more than a predetermined amplitude, resilient means to load said rod, a member mounted in said body for rotary oscillation with its axis of oscillation normal to the axis of said rod, the said rod being connected to said member at a point to provide a torque arm between said point and the axis of oscillation of the member, a light index carried by said member, and a calibrated scale disposed under said index.

FIDEL CORDERO.